Patented Oct. 10, 1939

2,175,925

UNITED STATES PATENT OFFICE 2,175,925

IGNITER-EXCITATION FOR IGNITRON SYSTEMS

Joseph Slepian, Pittsburgh, Pa., assignor to Westinghouse Electric & Manufacturing Company, East Pittsburgh, Pa., a corporation of Pennsylvania Application November 24, 1937, Serial No. 176,262

7 Claims. (Cl. 175—363)

My invention relates to electric discharge devices and more particularly to new and improved apparatus for exciting the starting electrodes of such devices.

Heretofore, there have been devised various excitation circuits for controlling the conductivity of arc discharge devices employing make-alive control members. Frequently it becomes desirable to provide means for exciting the make-alive electrodes continuously during predetermined periods of operation in order to secure positive starting. In many applications, thermionic tubes of the hot cathode type are employed. Short life and frequent replacement as well as high maintenance cost are some of the obstacles that make such excitation means undesirable.

According to my invention, an igniter-exciter supplies current impulses of proper magnitudes to the starting electrodes successively at proper spaced time intervals. This object is accomplished by means of a rotating machine designed to produce the proper impulses of current. For example, if it is desired to supply a converting system provided with six igniters, the machine can be designed with a rotating member which spans one-sixth of the periphery. Accordingly, the stationary member is provided with a polyphase winding with terminals extending therefrom and separately connected to the electrodes of the vapor-discharge devices.

It is, therefore, an object of my invention to provide a new and improved igniter-excitation apparatus for an electric valve converting system which will overcome the above-mentioned disadvantages of prior art systems and which will be simple and reliable in operation.

It is another object of my invention to provide for an igniter-exciter which will render conductive the starting electrodes of a multi-valve discharge device in a predetermined sequence.

Still further, it is another object of my invention to provide for a dynamo-electric machine capable of generating current impulses of predetermined magnitudes at properly spaced time intervals.

Figure 1:
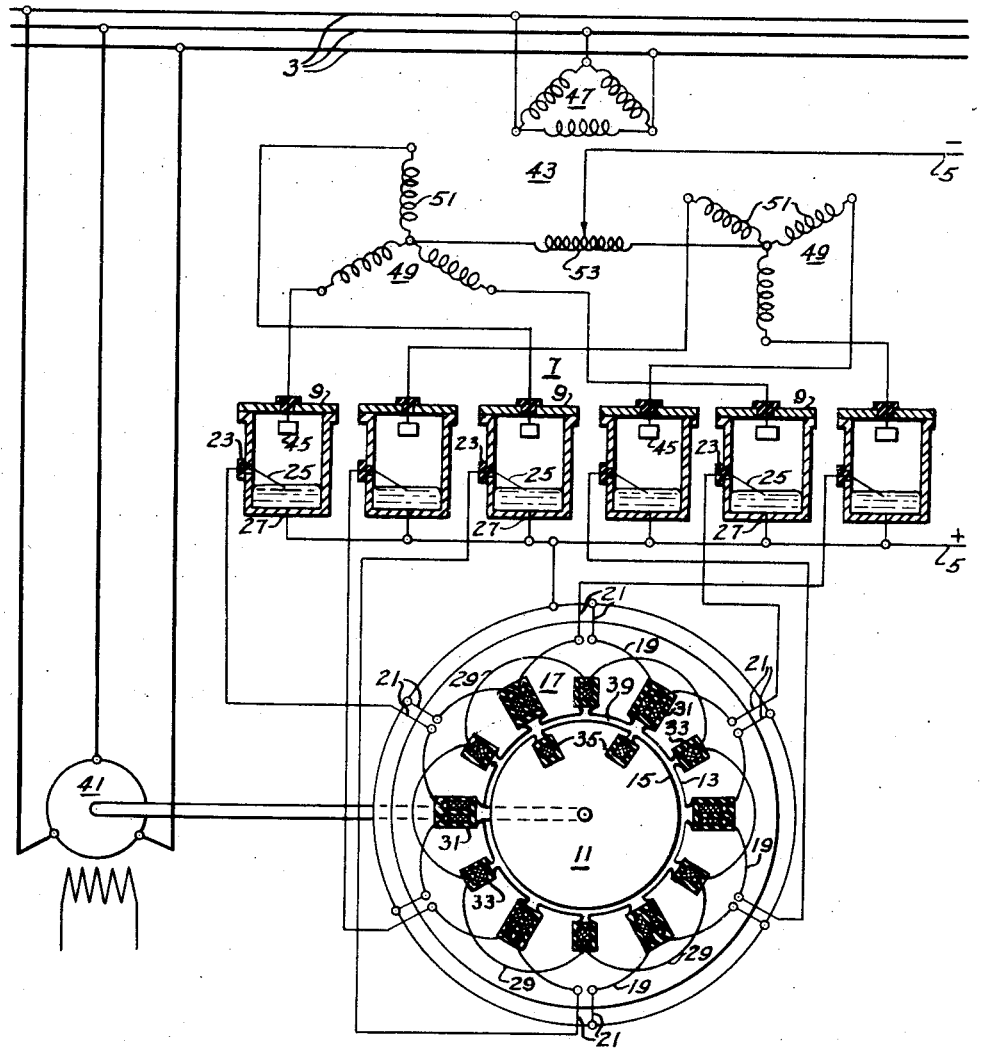
Figure 2:
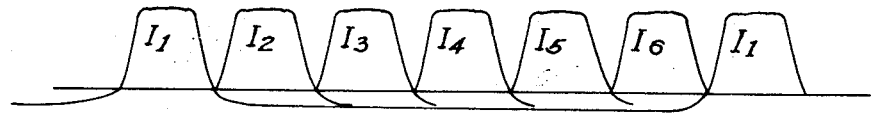

Other objects and advantages other than those mentioned will be apparent from the following description, when read in connection with the accompanying drawing, in which Figure 1 is a schematic illustration of an igniter-exciter machine connected to a multi-valve converting system embodying my invention; and, Fig. 2 is a graphical illustration of the generated current-impulses produced by the igniter-exciter according to my invention.

The apparatus according to my invention comprises an alternating current supply circuit 3 and a direct-current circuit 5 connected through a vapor-electric conversion system 7 consisting of a plurality of electric valves 9 or igniters and a dynamo-electric machine 11 for generating current impulses.

The machine 11 has a stator 13 as well as a rotor member 15. The stator member 13 is wound with a polyphase winding 17 divided into sections 19 with two terminals 21 extending therefrom. One terminal 21 of each section 19 is connected to the holder 23 of the starting electrode 25 while the other, 21, is connected to the cathode 27 of the vapor discharge device 9. A substantially independent winding 29, acting as a damping winding, forms a short circuited path about the stator member 13, and is in quadrature with the other stator member winding 17. Preferably, the damping winding 29 is constructed as a squirrel-cage winding. Separate slots 31 and 33 are provided for the stator member windings 17 and 29. One side of each polyphase winding coil 19 is placed in one side of a slot 31 while another side of an adjacent section of the polyphase winding 17 fills the other half of the same slot 31.

The rotor member 15 is provided with a field winding 35, the coils of which span one-sixth of the periphery. Similarly, the field winding 35 could be made to span one-twelfth of the periphery with a converter system 7 consisting of twelve igniters 9. The field winding 35 is supplied with direct current from a suitable source over slip rings (not shown). A small air gap 39 between the stator 13 and rotor members 15 is preferred to maintain proper voltage regulation. The rotor member 15 is driven by some suitable means, such as a synchronous motor 41, which obtains its source of supply potential from the alternating current supply circuit 3.

A suitable transformer 43 supplies energy to the converting system 7 which comprises a plurality of vapor-electric devices 9. Each of the devices 9 is provided with an anode 45, a cathode 27 and a starting electrode 25 for starting an arc therein. The primary 47 of the transformer 43 is connected to an alternating current supply circuit 3 and a secondary 49, having phase windings 51, is connected to the corresponding anodes 45 of the vapor-electric devices 9. The phase windings 51 of the transformer 43 are connected in multiple star and are separated by an interphase transformer 53 to provide a double three-phase circuit.

In the operation of the converter 7, according to my invention, the rotating member 15 of the igniter machine 11 is driven by some suitable means, such as a synchronous motor 41. A source of current is supplied to the field windings 35 through slip rings. Consider the field winding 35 in a position opposite one section 19 of the polyphase winding 17 as shown in the diagram. Due to the relative motion between one of the igniter coils 19 and the magnetic field, a current impulse is generated of such magnitude as to nearly completely annul the magnetic effect of the field winding 35. In a fraction of a revolution later, the field winding 35 is opposite one of the short-circuited coils 29 and current is induced in this coil 29 by induction such as to virtually oppose the magnetic effect of the field winding 35. Thus as the field member 15 continues to rotate, currents of such magnitude which are opposed to the magnetic effect of the field current are induced successively and alternately in the coils 19. Each individual coil 19 receives its maximum current at the instant the field coil 35 is directly opposite it.

Cycles of operation similar to the above take place in sequence for each section 19 of the stator winding 17 and are, therefore, not to be set forth in detail. By regulating the speed of the rotating field member 15, the frequency of the generated alternating currents may be controlled.

The igniter machine 11 is wound so that the voltage which would be induced on the open circuit would be many times the voltage required for the igniters 9, provided that the iron did not saturate. Saturation of the iron will limit the root mean square of the open circuit voltage of the igniter machine 11 to a smaller value, but it will still have very high peaks. The igniter machine 11, however, should not be operated without the igniters 9 being connected. In this respect, the igniter machine 11 is similar to a current transformer which should never be connected without secondary load. When operating with igniters 9, the machine 11 is operating under what corresponds to short circuit on usual generating machines so that the ampere-turns on the igniter coils 19 are nearly equal and opposite to the ampere-turns in the field winding 35, thereby maintaining a fixed relation between the current taken by the igniters 9 and that supplied to the field winding 33.

Curves in Fig. 2 represented by $I_1$, $I_2$, etc. illustrate the current supplied to the individual starting electrodes 25 of the vapor discharge devices 9. As will be seen, the current supplied to the starting electrodes 25 is high during the interval when the field winding 35 and a section 19 of the polyphase winding 17 are opposite each other and is at a low value with opposite polarity for the remaining part of the revolution of the field winding 35.

Although I have shown and described certain specific embodiments of my invention, I am fully aware that many modifications thereof are possible. My invention, therefore, is not to be restricted except insofar as is necessitated by the prior art or by the spirit of the appended claims.

I claim as my invention:

1. An excitation system for a plurality of vapor electric devices each having main electrodes and a make-alive electrode in contact with one of said main electrodes comprising a dynamo electric machine for supplying current to said make-alive electrodes, said machine having a field member and an armature member, a plurality of independent windings for said armature member, one of said windings forming a short-circuited path, another of said windings comprising a plurality of phase displaced sections with terminals extending therefrom, conductors for connecting each of said sections to the make-alive electrodes of said vapor electric devices, a winding on said field member spanning one-sixth the periphery of said phased sectional windings, and means for rotating the field member of said dynamo-electric machine.

2. In an electric translating system comprising a plurality of vapor electric valves each including at least two principal electrodes and a control member of the immersion-igniter type associated with one of said principal electrodes for starting an arc therein, and excitation circuit for said control member comprising a dynamo-electric machine for generating current impulses, terminals for impressing said current impulses on said control members at properly spaced time intervals and means for varying the speed of said igniter exciter whereby the frequency of power supplied is controlled.

3. In an electric translating system comprising a plurality of vapor electric valves each provided with main electrodes and a make-alive electrode in contact with one of said main electrodes, a dynamo-electric machine for supplying operating current to said make-alive electrode, said machine having an independent winding for each of said valves, connections from said windings to the electrodes of said valves, a substantially independent secondary winding associated with said first-mentioned winding forming a short-circuited path, a primary winding spanning one of said first-mentioned windings, a source of potential for said primary windings, and means for producing relative rotation between said primary and said independent windings whereby current impulses are sequentially generated.

4. In an exciting system for a plurality of vapor electric valves each having main electrodes and an auxiliary electrode in permanent contact with one of said main electrodes, a dynamo-electric machine for generating current impulses, terminals for impressing said current impulses on said auxiliary electrodes, said machine having a relatively large second harmonic in its voltage or current output.

5. In an exciting system for a plurality of vapor electric valves each having main electrodes and an auxiliary electrode in permanent contact with one of said main electrodes, a dynamo-electric machine for generating current impulses, terminals for impressing said current impulses on said auxiliary electrodes, said machine having relatively large even harmonics in its voltage or current output.

6. In an excitation system for supplying control impulses to a plurality of vapor electric valves each having a main anode, cathode and a make-alive electrode in permanent contact with the cathode, an impulse generator comprising a field member, an armature member, said field and armature members being relatively rotatable, two systems of windings on said armature, one winding system forming a short-circuited path, the other winding system including a plurality of substantially independent winding sections said winding sections being successively subjected to the influence of said field member.

7. In an exciting system for supplying current impulses to the make-alive electrode of a multi-valve make-alive type converter, an impulse generator comprising a field member, an armature member, a plurality of winding systems on said armature member, one of said winding systems providing a short-circuited path, another of said winding systems including a plurality of substantially independent windings spaced successively around said armature, said first and second winding systems being in quadrature to each other, connections from said second winding system to the make-alive electrode and means for rotating said field to successively actuate said independent windings.

JOSEPH SLEPIAN.